UNITED STATES PATENT OFFICE.

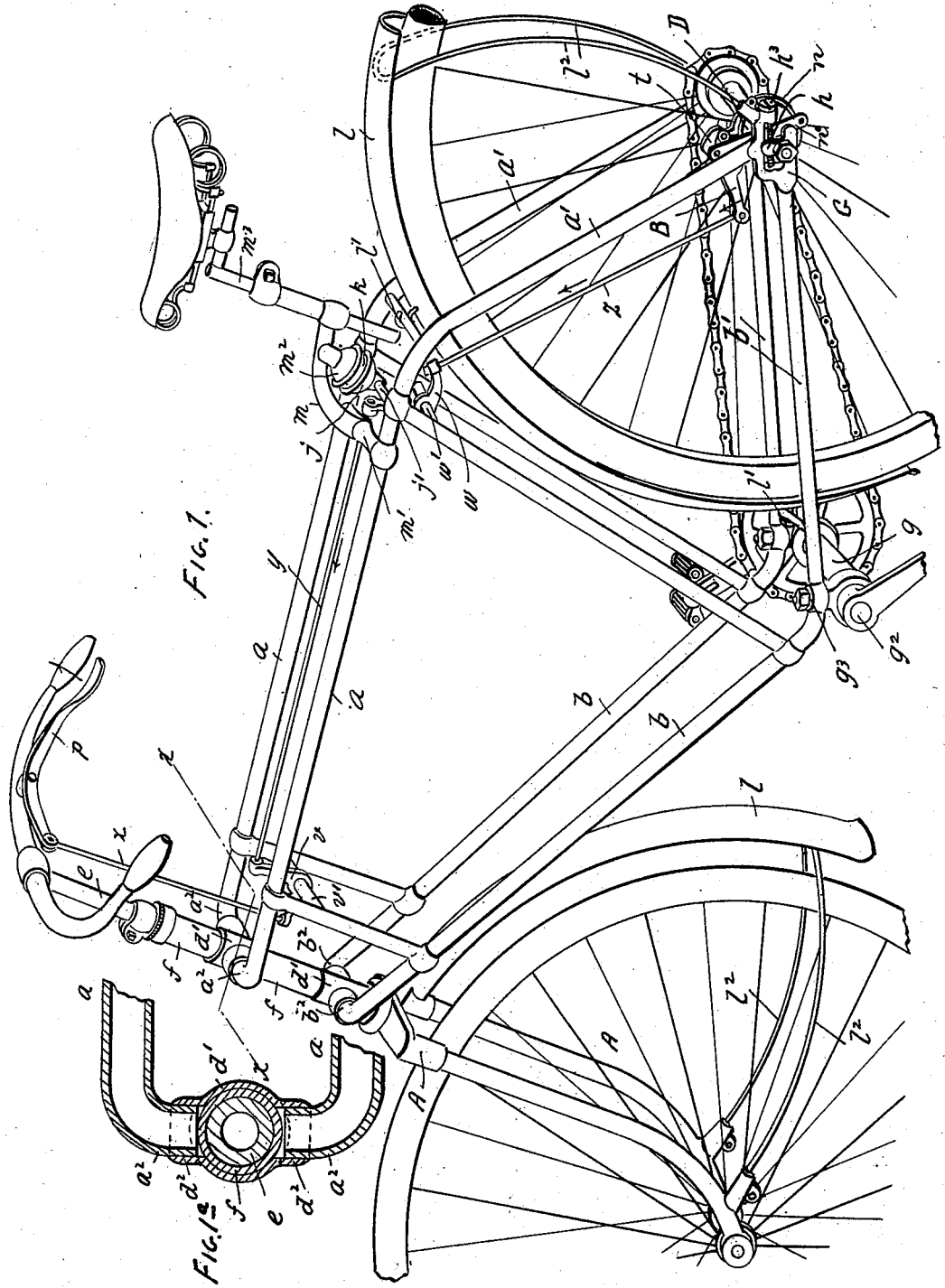

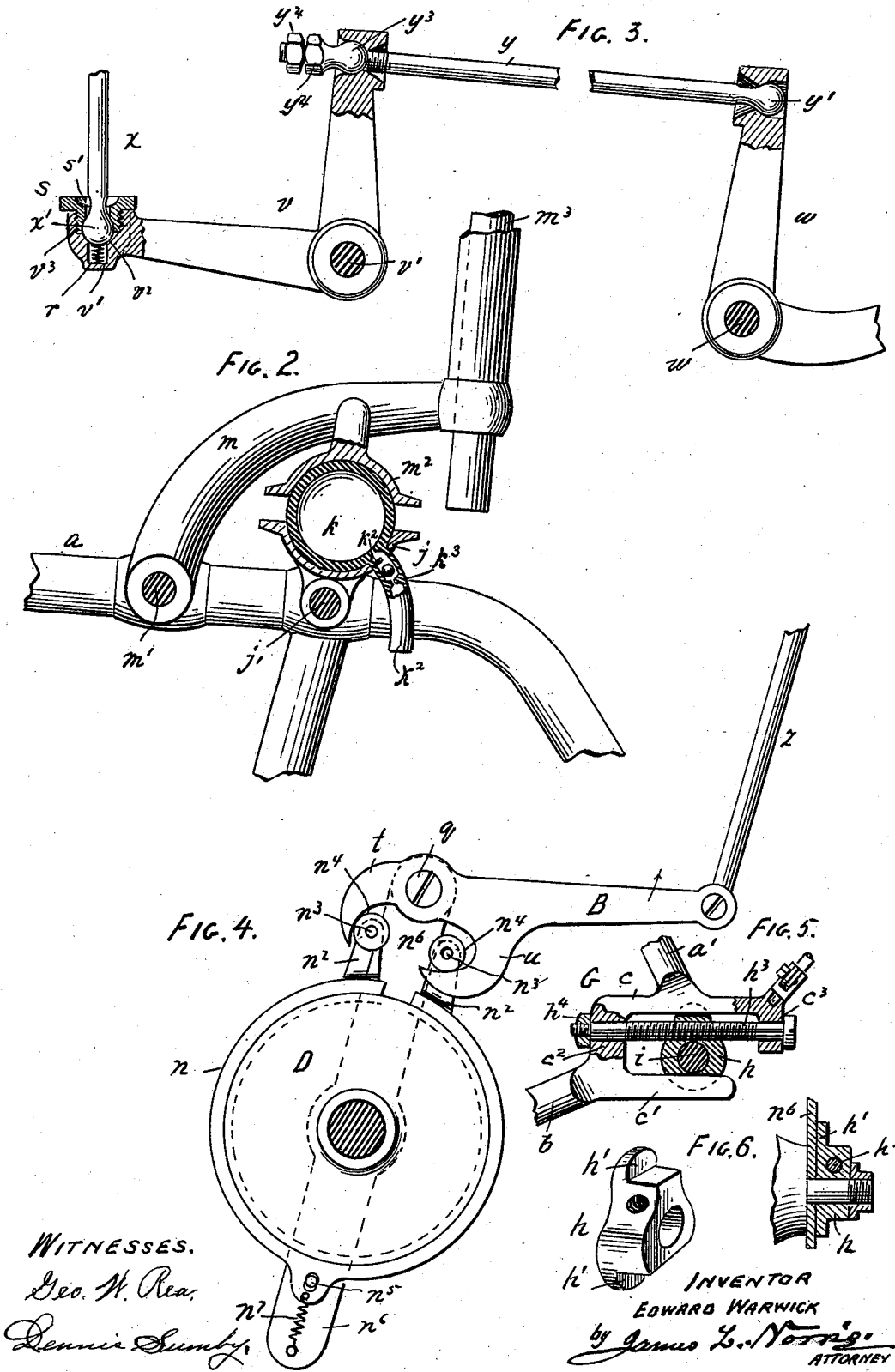

EDWARD WARWICK, OF BIRMINGHAM, ENGLAND.

BICYCLE.

SPECIFICATION forming part of Letters Patent No. 507,513, dated October 24, 1893.

Application filed November 18, 1892. Serial No. 452,442. (No model.)

*To all whom it may concern:*

Be it known that I, EDWARD WARWICK, a subject of the Queen of Great Britain, and a resident of Birmingham, in the county of Warwick, England, have invented certain new and useful Improvements in Bicycles, of which the following is a specification.

This invention relates to improvements in bicycles and it consists in the features of construction and the combination or arrangement of devices hereinafter described and claimed, reference being made to the accompanying drawings, in which—

Figure 1 is a perspective view of a safety double diamond frame bicycle embodying the improvements thereof, Fig. 1$^a$ being a cross section in detail on line $x$—$x$, Fig. 1. Fig. 2 is an enlarged view in elevation and vertical section of a part of the frame and saddle post, and the intervening air cushioning devices. Fig. 3 is an enlarged sectional elevation of the brake operating connections, Fig. 4 being a side view of an improved form of strap brake. Fig. 5 is a vertical sectional view through the device for adjusting the rear wheel bearing and sprocket wheel longitudinally relative to the forward sprocket wheel. Fig. 6 is a detail and perspective view of a sliding part embodied in said last described device.

In this machine the frame is of the double diamond form consisting of four tubes, $a$, $a$, and $b$, $b$, two, $a$, $a$, of which form the upper half of the double diamond frame, including what may be regarded as or corresponding to the rear fork, and the other two, $b$, $b$, constituting the under portion of the frame, having as an integral extension thereof or as rigidly connected thereto the portions, $b'$, $b'$, which extend at either side of the rear wheel. Each upper tube is transversely bent, as at $a^2$, the parallel rearward and more or less nearly horizontal sections, $a$, $a$, of the frame extending to a place just in advance of the rear wheel and thence downwardly extended in the portions, $a'$, $a'$. The lower tubes, $b$, $b$, are at their forward ends similarly angularly bent, as seen at $b^2$, the parallel main portions extending rearwardly and downwardly into proximity to the location of the crank-shaft and thence are turned and extended to the rear wheel bearings in the said portions, $b'$. The connection of the angularly disposed frame or fork constituting members, $a'$, $b'$, at either side of the rear wheel, is made by a uniting yoke or forging indicated at G, the same comprising an upper member, $c$, a lower member, $c'$, and the transverse uniting portion, $c^2$, and the lug, $c^3$, (see Figs. 1 and 5,) and said construction will be hereinafter referred to in connection with devices which co-act therewith for the take-up of the sprocket chain.

The front fork, A has the upwardly extended posts, $e$, fixed thereto, around which is the sleeve, $f$, which may freely rotate thereon. Around the said sleeve, $f$, at different points in its height are fixed collars, $d'$, which have lateral socket extensions, $d^2$, $d^2$, into which the bent extremities, $a^2$, $a^2$, $b^2$, $b^2$, of the frame tubes are fitted and secured, see Fig. 1$^a$. The frame and sleeve-like portion, $f$, of the head are therefore as one; and the front wheel and fork and the upwardly extended post, $e$, with the handle-bars and brake operating lever, $p$, pivoted on the latter therefore have swinging motions independent of the frame. A sliding block, $h$, is supported by and constrained for a longitudinal movement along each of the said yokes, G, the edge lips, $h'$, of the blocks lying at the sides of the yoke members preventing lateral displacement. The rear axle, $i$, is supported by the said blocks, the hub of the rear wheel and the sprocket wheel rotating on the axle which is fixed.

A shaft, $h^3$, is mounted for a rotational movement, in the parts, $c^2$, $c^3$, of each yoke, its intermediate portion being threaded and passing with a screw engagement through the sliding block, $h$.

The nut, $h^4$, and head on the shaft prevent displacement of the latter, and by turning the pair of said shafts at both of the yokes, G, the supporting axle and with it the rear wheel, and sprocket wheel may be bodily moved slightly forward or rearward relative to the crank shaft on which is the forward sprocket wheel,—and thereby any degree of tension may be had upon the chain.

I am of course aware that it is not broadly new to adjustably mount one of the sprocket wheels with relation to the other so that take-up capabilities for the chain may be assured for there have been heretofore, within my knowledge, several arrangements of parts to that end, and I therefore make hereinafter, no broad claim to a sprocket supporting device which is longitudinally adjustable, but merely claim a specific combination or arrangement of parts which is regarded as unusually advantageous and efficient.

The seat support is rendered yielding by being made vertically movable with relation to the frame, there being an air cushion which is supported on the frame and which, in turn, sustains the seat support; and particularly referring to Figs. 1 and 2 it will be seen that there is an upwardly open cup-like holder, $j$, pivotally supported on a transverse bar or stud, $j'$, having set therewithin and extending thereabove a spherical valved shell, $k$, of compressible material for receiving and retaining air. Said shell $k$ is provided with a down-hanging tubular branch, as shown, in which is a ball valve sufficiently smaller than the diameter of the air passage in which it is located to allow air which may be forced through said branch to pass freely by said valve. Upon the removal of the air forcing apparatus the valve will drop on its seat and retain the air within said shell. In order to prevent the ball from closing the contracting passage at the entrance of the shell $k$ a suitable stop, as a cross pin $k^2$, may be provided as shown in the drawings. This shell may be provided with any desirable or approved form of valve such as applicable for pneumatic tires. As an illustration of one form of valve for the yielding shell, the same is shown as comprised in the stem, $k^2$, formed with or connected to the shell and having communication therewith; an inner portion of the passage through said stem is contracted, as indicated at $k^3$, within which is the ball check-valve. The inflating pressure from the air pump, which may be connected to the end of stem $k^2$, will force the ball-valve inwardly away from its seat at $k^3$, but the air pressure within the shell $k$ will, after the disconnection of the pump, maintain the valve closed to its seat.

$m$ represents an arm which is pivotally mounted at $m'$, on the frame in advance of the air cushion, $k$, said arm projecting upwardly and rearwardly from its point of pivotal support over the air cushion and has on its under side a concave bearing member, $m^2$, for contact with the air cushion; the said arm, $m$, carries the saddle post, $m^3$. The slight rising and falling motion which the saddle post may have will insure a slight oscillating motion of the holder, $j$. The holder might, of course, be rigid and the part, $m^2$, pivoted on the arm, $m$, for like action, such being an inversion of parts as would undoubtedly be regarded as an equivalent.

By the provision of a valve for the air shell $k$, the yielding support for the seat may be at will rendered more or less elastic, as desired, or in accordance with the weight of the rider, by the degree of inflation-tension imparted.

D indicates a brake ring or disk affixed at the hub of the rear wheel around which is the encircling brake strap, $n$, which has radially extended lugs, $n^2$, with lateral studs, $n^3$, which carry friction rollers, $n^4$, thereon. The lever, B, is pivotally mounted on a suitable support therefor adjacent the lug-formed extremities of the brake strap, said lever having the arms, $t$, and $u$, which are extended from points at opposite sides of the pivot, $q$, of the lever, $b$; and the said arms have their edges which are adjacent the friction rollers formed to constitute cams or abutment surfaces which are operative when the lever is swung in one direction, (as shown by the arrows in Fig. 4,) to secure a constriction of the strap upon the brake disk or ring.

The mediums of connection between the brake operating lever, $p$, at the handle bar and the lever, B, which forms a part of the brake, consist of elbow levers, $v$ and $w$, pivotally mounted on transverse bars or studs, $v'$, $w'$, at different points fore-and-aft of the machine frame, and connecting-rods, $x$, $y$ and $z$, respectively, between the hand lever, $p$, and the forward arm for the elbow lever,—between the rear arm of the latter lever and the forward arm of the elbow lever, $w$, and between the rear arm of the latter lever and the brake lever, B.

As is usual in safety bicycles having a rear brake, and operating lever at the handle-bars, which of course have a swinging motion relative to the frame on which the brake is mounted, there is necessarily provided a connection between the lever, $p$, and the lever, $v$, which will permit of the said swinging movement without springing or straining the parts, and I have therefore provided an improved form of ball-and-socket connection between the connecting rod, $x$, and the forward arm of lever, $v$, which is regarded as an improvement over ball-and-socket connections heretofore provided in a corresponding situation in bicycles, which consists as follows, especial reference being had to Fig. 3: The forward arm of the lever, $v$, is apertured from its top the innermost portion of the opening forming a small socket, $v'$, which is open to a larger rounded depression, $v^2$, thereabove, the latter in turn opening to the larger threaded cylindrical opening, $v^3$. The connecting rod has its lower end provided with the knob, $x'$, which is set into the rounded depression and there retained by the thimble nut, $s$, through the flaring opening, $s'$, in which the neck of the connecting-rod passes, and at which it is permitted to have a rocking motion.

$r$ indicates a spring set in the innermost socket, $v'$, being held under spring reaction and bearing against the knobbed end of the connecting-rod and acts as a wear take up and anti-rattler.

The upright arms of the elbow lever, $v$ and $w$, have peculiarly formed apertures through their end portions for the connection of the rod, $y$. Each of the apertures has its orifice flaring and the ball ended rod, $y$, has the ball thereof lying in one of said flaring orifices, the rod being thence extended through the aperture of the one lever to and through that of the other, its end portion farther from the ball, $y'$, being screw threaded and receiving thereon a nut, $y^2$, which has the globular axially extended portion, $y^3$, which lies in the orifice at the lever arm which is the farthest from the one occupied by the ball. A locknut, $y^4$, is preferably used in conjunction with the threaded end of the connecting rod in the ball-nut, $y^2$. A straight draft is therefore had by the connecting rod, $y$, without any tendency of its buckling or straining itself or the levers which it engages.

The elbow levers, $v$ and $w$, are mounted on cross studs that form pivotal supports therefor which are mounted at upper forward and upper middle portions of the double diamond frame between the side sections thereof and the connecting or thrust rod lies just back of the handle bar post connecting the forward arm of lever, $v$, while the connecting rod, $y$, between both elbow levers is disposed practically parallel with and between and protected by the spaced sections, $a, a$, of the frame. The frame structure and the disposition relative thereto of the brake device is a most advantageous one as will be apparent.

As shown in Fig. 4, the brake strap, $n$, has a stud and slot engagement, as indicated at $n^5$, with the support, $n^6$, therefor and the spring, $n^7$, is applied with relation to the brake-strap so that when the same is permitted to spread more particularly at its upper portions, when the tension thereon by the brake operating devices is released the strap will be bodily moved and free from undue frictional contact with the brake disk, D.

In Fig. 1 there is shown for each wheel a detachable mud-guard the same consisting of the arc formed mud-guard proper, $l$, provided with an appliance, $l'$, here shown as consisting of a hook for support and engagement with a suitable supporting part of the machine outside of and adjacent the wheel rim, and spring arms, $l^2$, which are connected by riveting or otherwise to the mud-guard proper, extending angularly therefrom to detachable connection with supporting portions located within the wheel-rim, that is to say more especially near the bearings. The frame or fork is shown as provided with socketed lugs with binding screws for this connection. The application of the removable mud-guard is by first making the engagement of the extremities of the spring arms at the socketed lugs, and then by properly forcing the forward end of the mud-guard interlocking the hook with the suitably formed and located engagement member of the fork or frame, such a stress or tension as will effectually prevent lash and rattling.

I claim—

1. In a velocipede the combination with the frame having pivoted thereon an upwardly open cup-like metallic holder, of an arm pivoted at its one end on the frame adjacent said holder and thence upwardly and longitudinally extended over the holder and having on its under side the cup-like member, a spherical valved air-cushion between said cup-like member and the holder, and the saddle-post supported on said arm, substantially as set forth.

2. The combination with a lever having an opening the innermost portion of which forms a small socket the mouth of which is open to a larger rounded depression, the latter opening to the larger threaded cylindrical opening, of the connecting rod having at its lower end the knob set into the rounded depression, the spiral spring in the socket bearing against the knob and the thimble-nut, substantially as described.

3. The combination with the brake-ring or disk, and an encircling brake-band having near its ends separate engagement studs or projections of a lever pivoted to swing adjacent the said lugs and having at different places relative to the center of its movement cam formed forcing portions which engage the said brake-band projections for moving them at once in opposite directions, substantially as described.

4. The combination with the brake ring or disk and the encircling brake-band or strap having the radially extended lugs and the lateral roller carrying studs thereon of a lever pivoted adjacent said studs having cam-formed arms at opposite sides of the center of movement arranged for impingement upon said rollers for forcing, on the swinging of the lever in one direction, the extremities of the brake-band toward each other and connections extended from said lever to the head of the machine, substantially as described.

5. In brake operating devices the combination with the frame of the machine and lever pivoted thereon and each having apertures which in the most separated faces have rounded depressions and in the proximate faces outwardly flaring openings, the depressions and openings being connected by the contracted hole, the ball-ended connecting rod passed through one of said apertures with its knobbed extremity lying in the rounded depression and having its other end portion extended through the other apertured lever, and the internally threaded nut engaging the screw threaded end of the connecting rod and having the rounded extension fitted in the depression of the adjacent lever, substantially as and for the purpose described.

6. In brake operating devices for velocipedes two levers apertured as described whereby the rounded sockets and flaring openings are constituted, of the ball-ended screw-threaded connecting-rod, the internally threaded nut with the rounded extension, and the lock-nut, combined as shown.

7. A safety bicycle having a frame composed of transversely spaced and united diamond formed side sections and a brake device at the bearing of the rear wheel, of the elbow levers, *v* and *w*, and cross studs forming pivotal supports therefor which are mounted at upper forward and middle portions of the frame between the side sections thereof, the handle lever at the head, the thrust-rod, *x*, extending downwardly from the handle lever behind the handle-bar post to connection with the elbow lever, *v*, the longitudinally extended connecting-rod *y*, between upper members of the frame side sections and secured to both elbow levers, and a connection between the rear elbow lever and the brake, substantially as described.

8. A mud-guard for a bicycle consisting of an arc formed guard proper having at one portion a device for effecting an engagement of the guard with a suitable supporting part of the machine and having connected thereto at another portion one or more spring arms which are adapted to be connected under stress to another supporting part of the machine, substantially as for the purpose described.

9. In a velocipede the combination with a fixed supporting part of the machine near the bearing for the wheel, having attachment clips, of a mud-guard having spring arms extended therefrom to connection with said attachment clips said mud-guard having an appliance for its connection with a supporting part of the machine outside of and adjacent to the wheel rim, substantially as described.

In testimony that I claim the foregoing as my invention I have signed my name, in presence of two witnesses, this 28th day of June, 1892.

EDWARD WARWICK.

Witnesses:
ALFRED WILLIAM TURNER,
ISAAC MARKS.